A. GABUS.
METER REGISTER.
APPLICATION FILED FEB. 14, 1913.

1,091,326.

Patented Mar. 24, 1914.
2 SHEETS—SHEET 1.

Inventor
Adrian Gabus

Witnesses

By Victor J. Evans
Attorney

A. GABUS.
METER REGISTER.
APPLICATION FILED FEB. 14, 1913.

1,091,326.

Patented Mar. 24, 1914.
2 SHEETS—SHEET 2.

Inventor
Adrian Gabus

Witnesses
G. F. Pierce
John J. McCarthy

By Victor J. Evans
Attorney

UNITED STATES PATENT OFFICE.

ADRIAN GABUS, OF SPRINGFIELD, ILLINOIS.

METER-REGISTER.

1,091,326. Specification of Letters Patent. Patented Mar. 24, 1914.

Application filed February 14, 1913. Serial No. 748,409.

*To all whom it may concern:*

Be it known that I, ADRIAN GABUS, a citizen of the United States, residing at Springfield, in the county of Sangamon and State of Illinois, have invented new and useful Improvements in Meter-Registers, of which the following is a specification.

This invention relates to improvements in meter registers or indicators and has particular application to a register or indicator which may be used in conjunction with any type of meter operating mechanism, the latter being operated by the fluid to be measured or metered. It will be understood, however, that my invention is not limited to the metering of any particular fluid, as my improved register or indicator is equally applicable to electric current consumption circuits.

In carrying out the present invention, it is my purpose to provide a meter register or indicator wherein the indicating disks may be actuated independently of the operating mechanism of the meter thereby relieving the latter of any strain or tension incident to the friction set up in the transmission wheels.

It is also my purpose to provide a register for meters wherein the indicating disks will be operated in such manner as to jump from one reading to another and in which such indicating disks will have free or continuous movement under the action of the operating mechanism of the meter thereby relieving the operating mechanism of the strain incident to the continuous rotation of the transmission wheels and indicating disks.

Furthermore, I aim to provide a device of the class described which will embrace the desired features of simplicity, efficiently and durability coupled with cheapness of cost in manufacture and marketing and which may be readily and quickly installed and whereby a fine and accurate reading may be obtained at any time.

With the above and other objects in view, the invention consists in the construction, combination and arrangement of parts hereinafter set forth in and falling within the scope of the claim.

Figure 1:
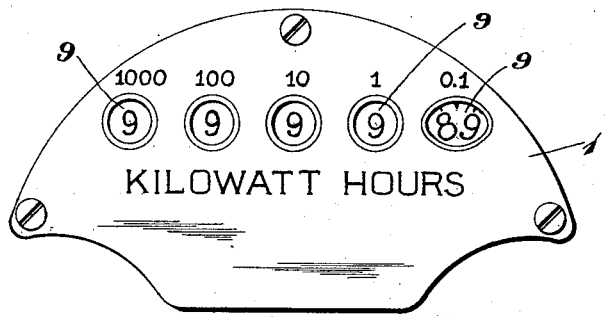
Figure 2:
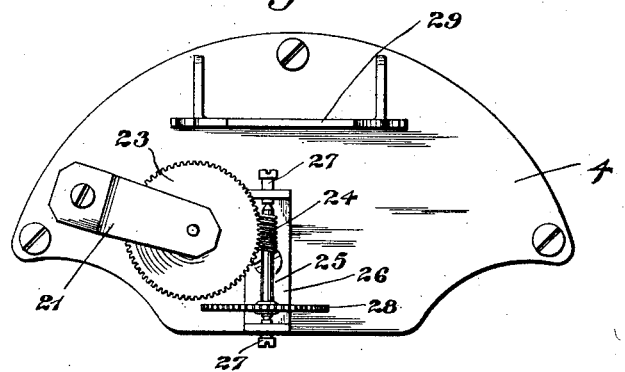
Figure 3:
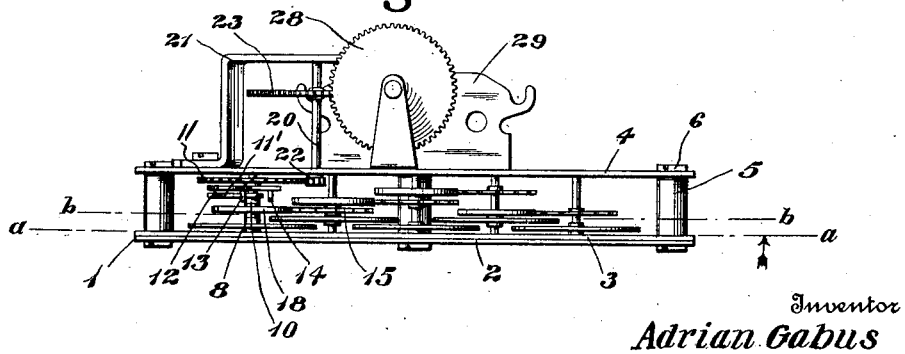
Figure 4:
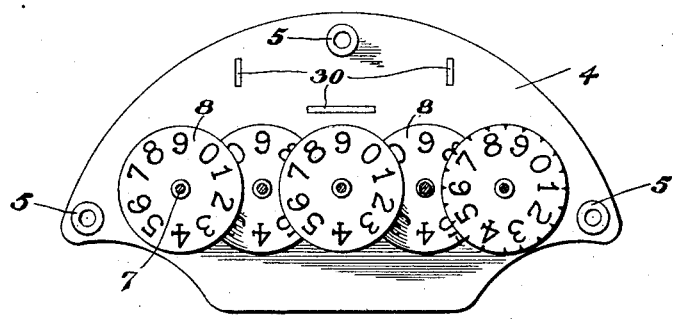
Figure 5:
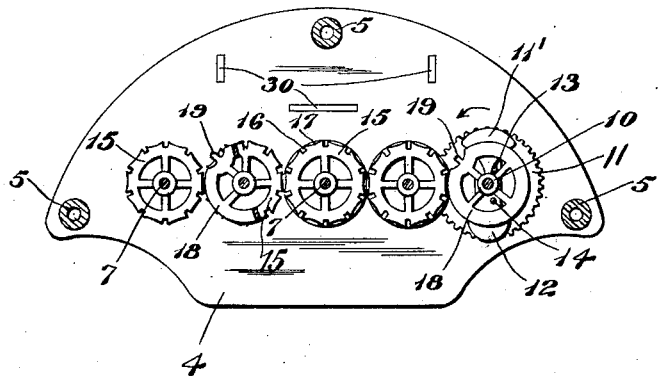

In the accompanying drawings; Figure 1 is a view in front elevation of a meter register or indicator constructed in accordance with my present invention. Fig. 2 is a rear elevation thereof. Fig. 3 is a bottom plan view. Fig. 4 is a longitudinal sectional view on the line 2—2 of Fig. 3, and Fig. 5 is a longitudinal sectional view on the line *b—b* of Fig. 3.

In the present instance, the face plate of the register or indicator is indicative of an electric meter, but it will be understood that the face plate may be marked in any suitable or desired manner in accordance with the circumstances and requirements of any particular case.

Referring now to the accompanying drawings in detail, the numeral 1 indicates the front plate of my improved meter register such plate, in the present instance, being composed of a face section 2 and a back section 3, while 4 designates the rear plate spaced apart from the front plate and held in parallelism therewith by means of sleeves 5 arranged between the plates adjacent to the edges thereof and alining with apertures in the plates, bolts 6 or the like being passed through such alining apertures and sleeves to hold the front and rear plates assembled.

Journaled in alining openings in the rear plate 4 and the rear section 3 of the face plate 1 are arbors 7 disposed in substantially the same plane and fixed to each arbor 7 is an indicating disk 8 disposed adjacent to the front plate 1, such disks having numerals thereon capable of observation through sight openings 9 formed in the front plate. One of these sight openings, the one to the right in Fig. 1 is preferably oval and relatively large as compared with the size of the remaining openings so that two adjacent numerals upon the proximate disk may be seen, through such opening, this last-named disk being graduated into fractions. By means of this construction, it will be seen that a fine and accurate reading may be obtained, the sight opening to the right in Fig. 1 showing the tenths or fraction disk, while the succeeding openings toward the left show respectively the units, tens, hundredths and thousandths indicating disks.

Loosely surrounding the arbors 7 of the tenths or fraction disk is a sleeve 10 to which the said disk is rigidly secured and upon one end of this sleeve is a weight 11', while rigidly secured to the respective arbor is a gear 11 to which is rigidly fastened an arm 12 provided with outwardly extending pins 13, 14, such pins being disposed at the opposite sides of the axis of the gear and to one side of the axis of the respective arbor. To each of the remaining arbors is rigidly secured a transmission disk 15 having formed in the periphery thereof notches 16 suitably spaced apart and between the notches the periphery of the disk is concaved as at 17, while fastened to each arbor 7 of the units, ten and hundredths disks and the sleeve 10 of the tenths or fraction disk is a second transmission wheel 18 disposed in a plane coincident with that of the first transmission wheel on an adjacent arbor and having the periphery thereof adapted for rotation within the concaved portions of such first transmission wheel. Extending outwardly from the periphery of each of the second-named transmission wheels is a lug 19 adapted to enter the peripheral notches 16 of the adjacent transmission wheel of the first-mentioned set so that the various indicating disks of the register or indicator may be operated properly from the operating mechanism of the meter. In the present instance, motion is transmitted to the gear 11 on the arbor of the tenths or fraction disk from the operating mechanism of the meter through the medium of a shaft 20 journaled in the rear plate 4 and one limb of a bracket 21 secured to such rear plate and provided with a pinion 22 meshing with the gear 11. Upon this shaft 20 is keyed or otherwise suitably fastened a worm gear 23 meshing with a worm 24 on a shaft 25 journaled in a bridge piece or bracket 26 carried by the rear face of the rear plate 4 and of substantially U-shape, the opposite limbs of such bracket or bridge piece being provided with set screws 27, 27 forming bearings for the opposite ends of the shaft 25. In this form of my invention, the shaft 25 is equipped with a gear 28 which is adapted to mesh with a pinion or the like of the operating mechanism of the meter, such operating mechanism, as usual, being under the control of the fluid to be metered or, in the event that the register is used in conjunction with an electric meter, the electric current flowing through the consumption circuit.

From the foregoing description taken in connection with the accompanying drawings, the construction, mode of operation and manner of employing my improved register or indicator for meters will be readily understood.

In the operation of the register, power is conveyed to the gear 11 on the arbor 7 of the tenths disk by way of the shaft 25, worm 24, worm wheel 23, shaft 20 and pinion 22 meshing with the gear 11 and, assuming the weight 11' to be in the position shown in Fig. 5, the gear 11 in this movement will carry with it the arm 12 and the pins 13 and 14, the first pin throwing the weight 11' out of balance whereby the sleeve 10 and the transmission wheel secured thereto will be rotated relatively fast while the second-named pin acts as a stop so as to prevent undue swinging movement of the weight after the latter has been thrown downwardly, the teeth 19 of such transmission wheel entering the adjacent notch 16 in the corresponding transmission wheel 15 on the adjacent arbor with the effect to rotate the units dial. In the present instance, each transmission wheel 15 is provided with ten peripheral notches and consequently the units wheel rotates one-tenth of a revolution to every revolution of the tenths or fraction disk while the tens disk is rotated one-tenth of a revolution to each revolution of the units disk. Similarly, the hundredths disk is rotated one-tenth of a revolution to every revolution of the tens disk while the thousandths disk makes one-tenth of a revolution to every complete revolution of the hundredths disk. Thus, it will be seen that the register may be accurately read at any time.

It will be noted that the sleeve 10, the arm 12 and the weight 11' constitute a means whereby the indicating disks are jumped from one reading to another thereby relieving the operating mechanism of the meter from any strain or tension incident to the friction in the gear train.

In the embodiment of my invention selected for illustrative purposes, a bracket 29 is provided at one edge with lugs adapted to be disposed within slots 30 formed in the rear plate 4 of the register and is designed for the purpose of supporting or holding the register or indicator upon the meter.

While I have herein shown and described one preferred form of my invention by way of illustration, I desire it to be understood that I do not limit or confine myself to the precise details of construction herein described and delineated, as modification and variation may be made within the scope of the claim and without departing from the spirit of the invention.

I claim:

A meter indicator comprising a plurality of indicating disks, an arbor for each disk, transmission wheels upon said arbor for imparting movement thereof, snap acting means including a sleeve loosely surrounding one of said arbors and fixed to the transmission wheel thereon, a weight fastened to said sleeve, a gear loosely surrounding the respective arbor in proximity to said weight and in a plane parallel therewith, an arm fastened to the inner face of said gear and extending across the same, and pins extending outwardly from said arm and disposed at the opposite sides of the axis of the gear and upon one side of the axis of the respective arbor and designed to be engaged by said weight substantially as, and for the purpose, described.

In testimony whereof I affix my signature in presence of two witnesses.

ADRIAN GABUS.

Witnesses:
 ADOLPH LOEB,
 WILLIAM DELACHAUX.

Copies of this patent may be obtained for five cents each, by addressing the "Commissioner of Patents. Washington, D. C."